United States Patent
Schmutzer et al.

(10) Patent No.: US 12,003,396 B2
(45) Date of Patent: Jun. 4, 2024

(54) ASYMMETRY COMPENSATION FOR PRIVATE LINE EMULATION

(71) Applicant: Cisco Technology, Inc., San Jose, CA (US)

(72) Inventors: Christian Schmutzer, Koenigsbrunn Im Weinviertel (AT); Luca Della Chiesa, Concorezzo (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 285 days.

(21) Appl. No.: 16/851,631

(22) Filed: Apr. 17, 2020

(65) Prior Publication Data
US 2021/0203577 A1    Jul. 1, 2021

Related U.S. Application Data

(60) Provisional application No. 62/955,549, filed on Dec. 31, 2019.

(51) Int. Cl.
*H04L 43/0852* (2022.01)
*H04L 47/56* (2022.01)

(52) U.S. Cl.
CPC .......... *H04L 43/0852* (2013.01); *H04L 47/56* (2013.01)

(58) Field of Classification Search
None
See application file for complete search history.

(56) References Cited

U.S. PATENT DOCUMENTS

| 7,110,423 | B1 * | 9/2006 | Sethuram .............. H04L 7/0008 370/519 |
| 9,491,728 | B2 | 11/2016 | Wen et al. |
| 9,686,034 | B2 | 6/2017 | Ruffini et al. |
| 9,762,318 | B2 | 9/2017 | Xu et al. |
| 10,075,258 | B2 | 9/2018 | Dutti et al. |
| 10,313,103 | B1 | 6/2019 | Perras et al. |
| 10,389,645 | B2 | 8/2019 | Qi et al. |
| 10,439,712 | B2 | 10/2019 | Mehrvar et al. |

(Continued)

OTHER PUBLICATIONS

ADVA Optical Networking, "Evolving the metro network", Metro optical network infrastructure for the cloud generation, Nov. 2017, 8 pages.

*Primary Examiner* — Jason E Mattis
*Assistant Examiner* — Bao G Nguyen
(74) *Attorney, Agent, or Firm* — Edell, Shapiro & Finnan, LLC (57) ABSTRACT

In one example, an indication of a time during which a network communication obtained from a first network node was processed by the first network node, and an indication of a propagation delay from a second network node to the first network node, are obtained. A time during which the network communication was processed by the second network node is determined. A propagation delay from the first network node to the second network node is calculated based on the time during which the network communication was processed by the first network node and the time during which the network communication was processed by the second network node. A difference between the propagation delay from the first network node to the second network node, and the propagation delay from the second network node to the first network node, is determined and compensated is made for that difference.

20 Claims, 7 Drawing Sheets

(56) References Cited

U.S. PATENT DOCUMENTS

| | | | |
|---|---|---|---|
| 2007/0097865 A1* | 5/2007 | Song | H04L 47/24 370/252 |
| 2014/0003238 A1* | 1/2014 | Finkelstein | H04L 47/52 370/417 |
| 2016/0309491 A1* | 10/2016 | Dai | H04W 72/085 |
| 2017/0289827 A1* | 10/2017 | Harel | H04B 17/364 |
| 2018/0076949 A1* | 3/2018 | Mayer | H04J 3/0667 |
| 2022/0210850 A1* | 6/2022 | Ke | H04L 45/28 |

* cited by examiner

ASYMMETRY COMPENSATION FOR PRIVATE LINE EMULATION

CROSS REFERENCE TO RELATED APPLICATION

This application claims the benefit of U.S. Provisional Application No. 62/955,549, filed Dec. 31, 2019, the entirety of which is incorporated herein by reference.

TECHNICAL FIELD

The present disclosure relates to telecommunications.

BACKGROUND

Private Line Emulation (PLE) is a framework that allows for bit transparent transport of high speed signals over a Multi-Protocol Label Switching (MPLS) infrastructure. PLE is similar to circuit emulation concepts such as Structure-Agnostic Time-Division Multiplexing (TDM) over Packet (SAToP), Circuit Emulation Services over Packet (CESoP) and Circuit Emulation over Packet (CEP) that have been defined in the past for carrying Synchronous Optical Networking (SONET)/Synchronous Digital Hierarchy (SDH)/Plesiochronous Digital Hierarchy (PDH) signals. PLE leverages Virtual Private Wire Service (VPWS) packet encapsulation and decapsulation and Differential Clock Recovery (DCR) to maintain the clock of the transported signal (frequency). As such, PLE is an alternative to deploying an Optical Transport Networking (OTN) network for delivering similar services such as transparent 10 Gbps connections.

DESCRIPTION OF EXAMPLE EMBODIMENTS

Overview

In one example embodiment, an indication of a time during which a network communication obtained from a first network node was processed by the first network node, and an indication of a propagation delay from a second network node to the first network node, are obtained. A time during which the network communication was processed by the second network node is determined. A propagation delay from the first network node to the second network node is calculated based on the time during which the network communication was processed by the first network node and the time during which the network communication was processed by the second network node. A difference between the propagation delay from the first network node to the second network node, and the propagation delay from the second network node to the first network node, is determined. Compensation is made for the difference between the propagation delay from the first network node to the second network node, and the propagation delay from the second network node to the first network node.

Example Embodiments

Figure 1:
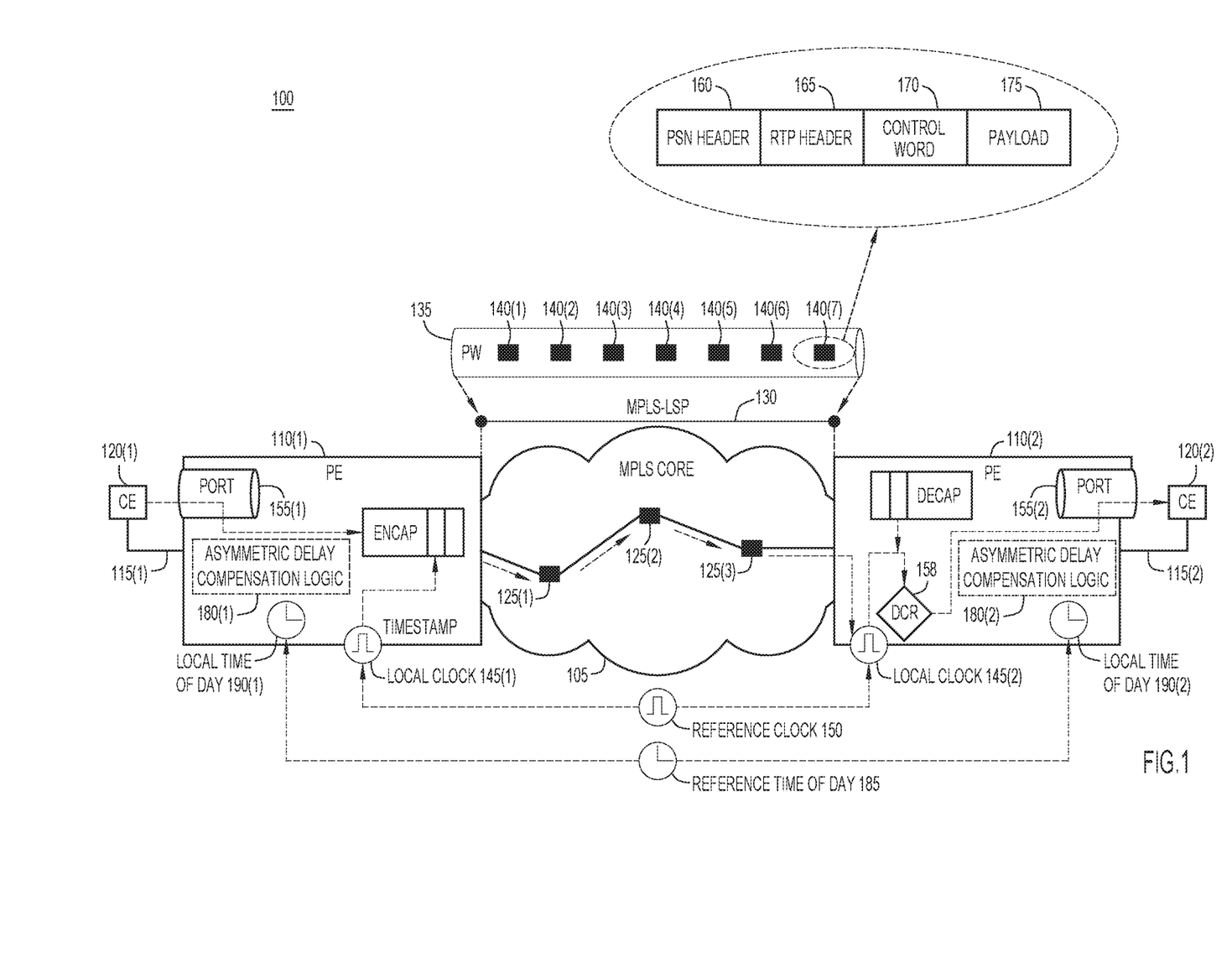
FIG. 1 illustrates a Private Line Emulation (PLE) network configured for asymmetry compensation, according to an example embodiment.

FIG. 1 illustrates an example Private Line Emulation (PLE) network 100 configured for asymmetry compensation. PLE network 100 includes MPLS core 105, network nodes (e.g., Provider Edge devices (PEs)) 110(1) and 110(2), Attachment Circuits (ACs) 115(1) and 115(2), and Customer Edge devices (CEs) 120(1) and 120(2). MPLS core 105 further includes network nodes 125(1)-125(3), which form an MPLS Label-Switched Path (MPLS-LSP) 130 between PEs 110(1) and 110(2). Pseudowire (PW) 135 may emulate a physical wire through a point-to-point connection between PEs 110(1) and 110(2). Thus, CEs 120(1) and 120(2) may communicate with one another by sending one or more network communications (e.g., network frames, network packets 140(1)-140(7), etc.) over PW 135. PW 135 may be mapped to MPLS-LSP 130 in order to carry out the network communication for PW 135 across the MPLS core 105.

In one example, MPLS core 105 runs an Interior Gateway Protocol (IGP) such as Open Shortest Path First (OSPF) or Intermediate System-to-Intermediate System (IS-IS). MPLS core 105 may also run a traffic engineering protocol such as Resource Reservation Protocol for Traffic Engineering (RSVP-TE) or Segment Routing for Traffic Engineering (SR-TE). PW 135 may be established via Targeted Label Distribution Protocol (T-LDP) for Virtual Private Wire Service (VPWS), and ACs 115(1) and 115(2) may utilize Synchronous Optical Network (SONET), Ethernet, or Optical Transport Networking (OTN) technology. However, any suitable paradigm/protocol may be utilized in conjunction with the techniques presented herein. For example, any suitable tunneling technology may be used instead of MPLS, such as Layer 2 Tunneling Protocol (L2TP), User Datagram Protocol (UDP), Internet Protocol (IP), etc. As an alternative to MPLS core 105, the core may be based on IP or Segment Routing over IP version 6 (SRv6).

Initially, PEs 110(1) and 110(2) may be configured to send/receive optical signals to/from each other based on synchronized system frequencies (e.g., synchronized local clocks 145(1) and 145(2)). Local clocks 145(1) and 145(2) may be synchronized via any suitable mechanism, such as external timing input (e.g., Building Integrated Timing Supplies (BITS), 10 MHz, etc.), Synchronous Ethernet (SyncE), Precision Time Protocol (PTP), etc., based on reference clock 150. For example, PE 110(1) may obtain a network communication (e.g., a network frame) from CE 120(1) via port 155(1), add (e.g., via encapsulation) to the network communication an RTP counter based on local clock 145(1), and send the network communication to PE 110(2) over PW 135 as a network packet. PE 110(2) may determine the RTP counter from the network communication (e.g., via decapsulation), and use the RTP counter to perform Differential Clock Recovery (DCR) as shown at reference numeral 158 before sending the network communication (e.g., as a network frame) to CE 120(2) via port 155(2).

The network packet referenced in the aforementioned example may be network packet 140(7). As shown, network packet 140(7) is a structure-agnostic emulation packet that includes Packet Switched Network (PSN) header 160, Real-time Transport Protocol (RTP) header 165, control word 170, and payload 175. PSN header 160 may direct network packet 140(7) to PE 110(2) via PW 135. RTP header 165 may be used for transfer of timing information. Control word 170 may identify a sequence number used to provide a common PW sequencing function as well local and remote failure indication between PE 110(1) and PE 110(2). RTP header 165 or control word 170 may include the timestamp referenced in the aforementioned example. Payload 175 may include a fixed number of octets received from AC 115(1). It will be appreciated that network packets 140(1)-140(6) may have similar structures, and that PE 110(2) may send one or more similarly structured network packets to PE 110(1). However, any suitable network packet structure may be employed in accordance with techniques presented herein.

Synchronization techniques such as external timing input, SyncE, PTP, etc., may help synchronize local clocks 145(1) and 145(2), but they cannot ensure that the propagation delay from PE 110(1) to PE 110(2) (also referred to herein as "the forward propagation delay") is identical to the propagation delay from PE 110(2) to PE 110(1) (also referred to herein as "the reverse propagation delay"). In other words, such synchronization techniques cannot ensure symmetric propagation delay in PLE network 100. As used herein, the term "propagation delay" may refer to an amount of time for a network packet to travel from one network node from another. Asymmetric propagation delay can arise, for example, when an optical fiber used to send network communications in one direction (e.g., from PE 110(1) to 110(2)) has a greater length than an optical fiber used to send network communications in another direction (e.g., from PE 110(2) to PE 110(1)). Other causes of asymmetric propagation delay may include differences in forwarding delay through devices or the use of Digital Signal Processing (DSP) (e.g., coherent DSP), transmission technologies for links in MPLS core 105, the temperature of the optical fiber(s), etc.

Propagation delay may be measured based on any suitable start time and end time. For example, the propagation delay may be measured starting at or near ingress of a network packet to PE 110(1)/110(2) and ending at or near egress of a network packet to PE 110(2)/110(1). However, there are other options for measuring propagation delay (e.g., starting at or near ingress of a network packet to PE 110(1)/110(2) and ending at or near ingress of a network packet to PE 110(2)/110(1), starting at or near egress of a network packet to PE 110(1)/110(2) and ending at or near egress of a network packet to PE 110(2)/110(1), etc.). More generally, the start time of propagation delay may be any suitable time during which a network packet is being processed by PE 110(1)/110(2), and the end time of propagation delay may be any suitable time during which a network packet is being processed by PE 110(2)/110(1).

Asymmetric propagation delay is a growing problem with the advent of 5G networking. In particular, the industry is struggling to meet stringent 5G time synchronization requirements demanded by the transport infrastructure of accuracies on the order of 100s (hundreds) of nanoseconds. Optical Transport Networking (OTN) switching, for example, is commonly used by carriers to provide transparent 10 Gbps connections to mobile operators, but this introduces significant delay asymmetries. These delay asymmetries can prevent the mobile operator from achieving adequate time synchronization accuracy because PTP recovery (for example) is based on the fundamental assumption that the connections between nodes have perfect delay symmetry.

Accordingly, asymmetric delay compensation logic 180(1) and 180(2) are provided on PEs 110(1) and 110(2), respectively, to address asymmetry problems in connections delivered over legacy networks (e.g., legacy OTN networks). In one example, asymmetry correction is made in the egress buffer of a PE by measuring and encoding time and delay information Out-Of-Band (OOB) or in a Private Line Emulation (PLE) header. The egress buffer may buffer network communications for any suitable amount of time (e.g., on the order of nanoseconds or microseconds). In one example, egress buffer may be used for asymmetry compensation as well as de jitter to address Packet Delay Variation (PDV) (e.g., between 200 and 400 microseconds). Asymmetric delay compensation logic 180(1) and 180(2) thus enables emulation of a virtual fiber or physical transparent connection that has symmetric propagation delay, even where the underlying network is not symmetric. Asymmetric delay compensation logic 180(1) and 180(2) may utilize reference time of day 185 to align local times of day 190(1) and 190(2) (e.g., using PTP or external time of day input). Unlike local clocks 145(1) and 145(2) and reference clock 150, which are used to track frequencies on behalf of PEs 110(1) and 110(2) in accordance with conventional approaches, reference time of day 185 and local times of day 190(1) and 190(2) enable PEs 110(1) and 110(2) to signal timestamps to each other in accordance with techniques described herein.

Figure 2A:
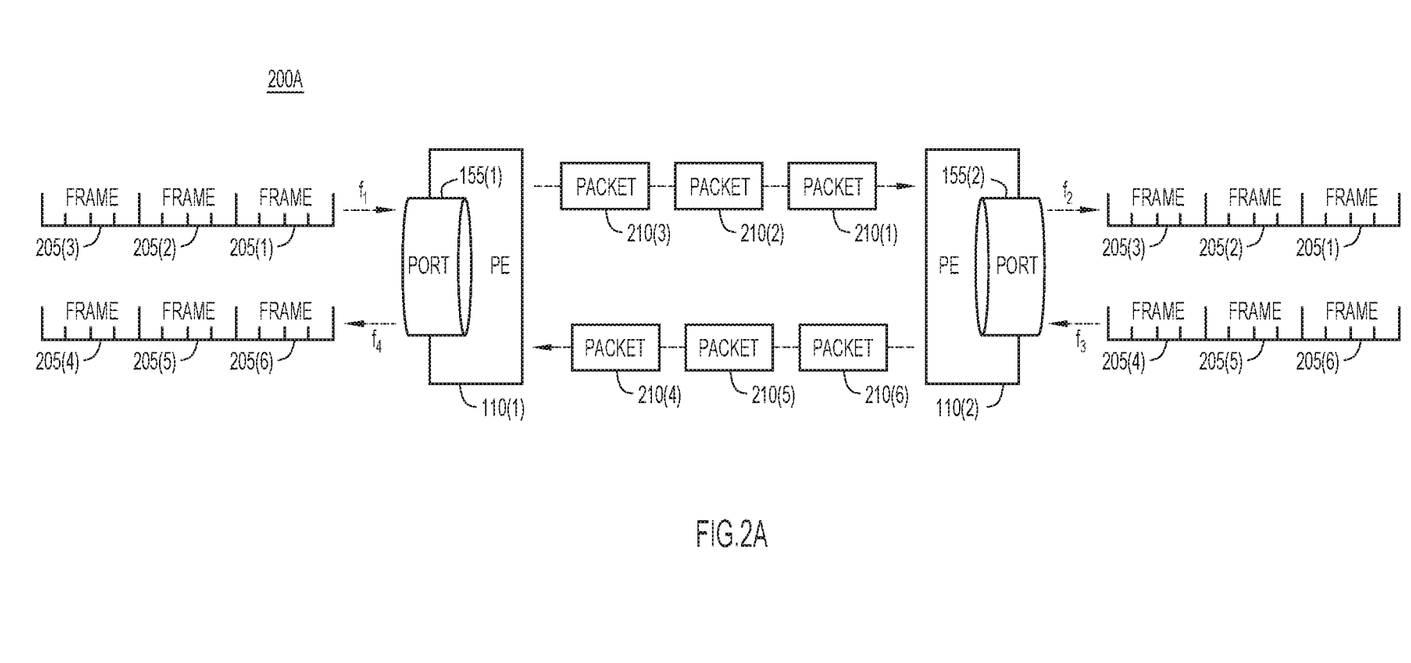
FIGS. 2A and 2B illustrate representations of forward and reverse propagation delays in a PLE network, according to an example embodiment.
Figure 2B:
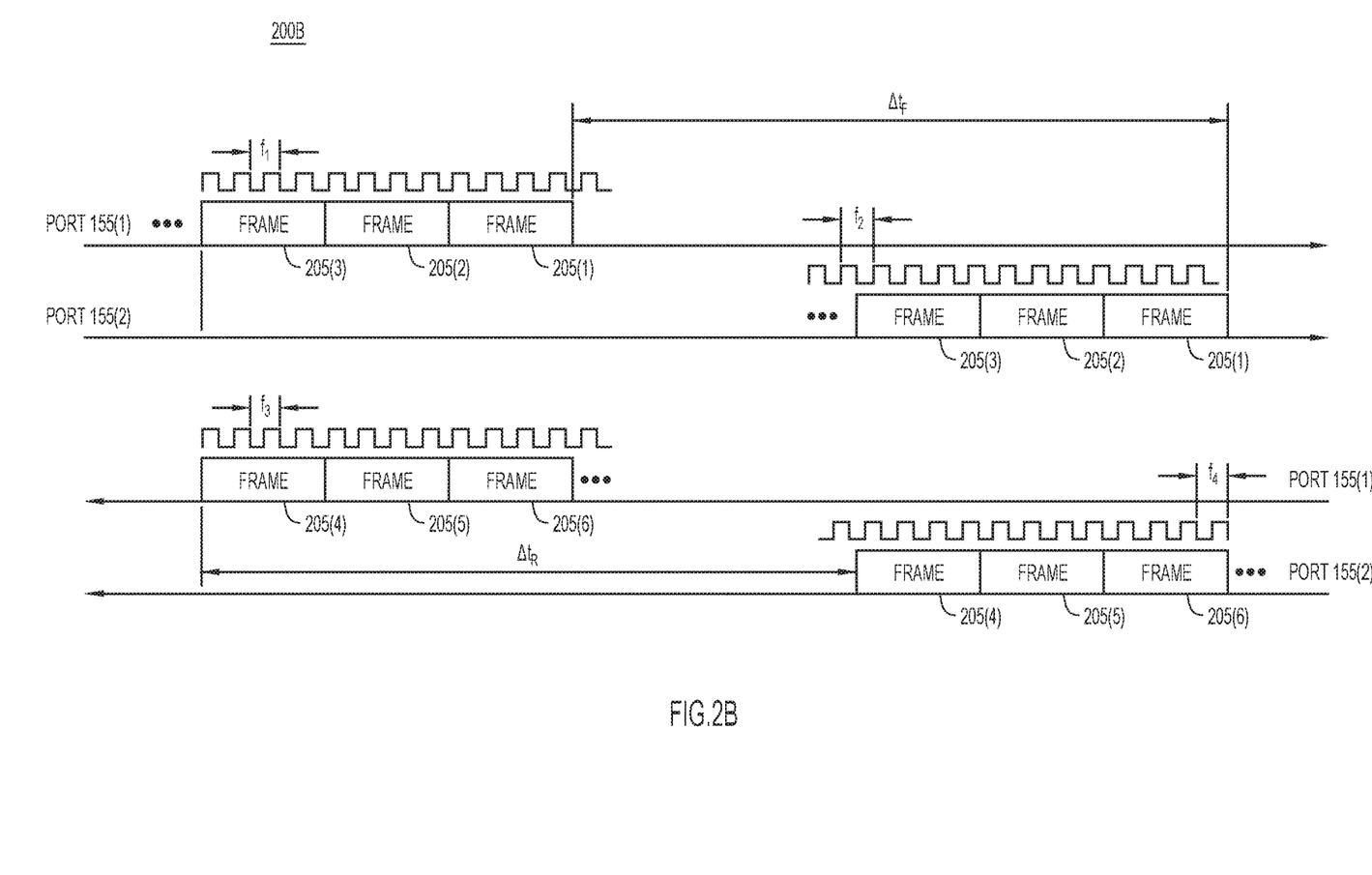

With continuing reference to FIG. 1, FIGS. 2A and 2B illustrate diagrammatic representations 200A and 200B of forward and reverse propagation delays $\Delta t_F$ and $\Delta t_R$ in PLE network 100. As shown in FIG. 2A, PE 110(1) obtains, via port 155(1), network frames 205(1)-205(3), and sends (e.g., via PW 135) corresponding network packets 210(1)-210(3) to PE 110(2), which outputs network frames 205(1)-205(3) via port 155(2). Similarly, PE 110(2) obtains, via port 155(2), network frames 205(4)-205(6), and sends (e.g., via PW 135) corresponding network packets 210(4)-210(6) to PE 110(2), which outputs network frames 205(4)-205(6) via port 155(1). Network frames 205(1)-205(3) may have a frequency $f_1$ on port 155(1) and a frequency of $f_2$ on port 155(2). Network frames 205(4)-205(6) may have a frequency $f_3$ on port 155(2) and a frequency of $f_4$ on port 155(1).

As shown in FIG. 2B, forward propagation delay $\Delta t_F$ is measured beginning when network frame 205(1) is first received at port 155(1), and ending when network frame 205(1) is first transmitted from port 155(2). Similarly, reverse propagation delay $\Delta t_R$ is measured beginning when network frame 205(4) is first transmitted from port 155(2), and ending when network frame 205(4) is first received at port 155(1). DCR 158 may be used to ensure that the frequency $f_1$ of network frames 205(1)-205(3) on port 155(1) is identical (or substantially similar) to the frequency $f_2$ of network frames 205(1)-205(3) on port 155(2), and to ensure that the frequency $f_3$ of network frames 205(4)-205(6) on port 155(2) is substantially similar to the frequency $f_4$ of network frames 205(4)-205(6) on port 155(1). However, as noted, DCR 158 (and other existing synchronization techniques) do not compensate for asymmetry between forward and reverse propagation delays $\Delta t_F$ and $\Delta t_R$.

Figure 3:
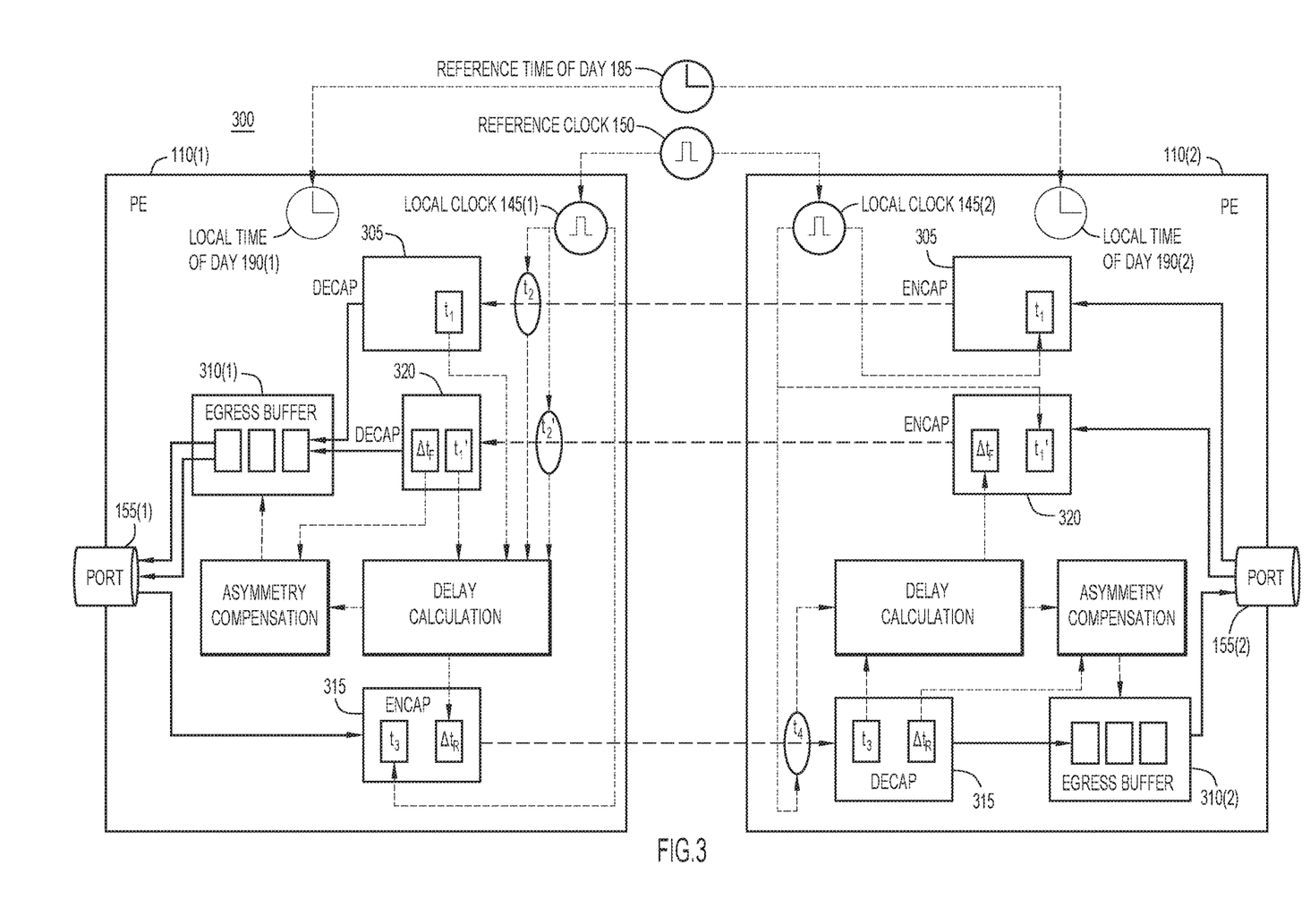
FIG. 3 illustrates a functional diagram depicting PLE network asymmetry compensation, according to an example embodiment.

With continuing reference to FIG. 1, FIG. 3 illustrates a functional diagram 300 depicting PLE network asymmetry compensation. Briefly, PEs 110(1) and 110(2) both perform two functions, delay calculation and asymmetry compensation, with PE 110(1) responsible for calculating the propagation delay from PE 110(2) to PE 110(1) (i.e., reverse propagation delay $\Delta t_R$), and PE 110(2) responsible for calculating the propagation delay from PE 110(1) to PE 110(2) (i.e., forward propagation delay $\Delta t_F$).

In one example, PE 110(2) may obtain network communication 305 (e.g., a network frame) via port 155(2) and insert an indication of a first time $t_1$ during which network communication 305 was processed by PE 110(2) based on local time of day 190(2). For example, PE 110(1) may obtain network communication 305 from CE 120(1), packetize data from network communication 305 to a payload, and encapsulate the payload with a control word, RTP header, and PSN header. The first time $t_1$ may be a time at or near ingress of network communication 305 to port 155(2). PE 110(2) may provide network communication 305, including the indication of the first time $t_1$, to PE 110(1). The indication of the first time $t_1$ may be inserted as a timestamp comprising an RTP timestamp, a control word, or a dedicated field of network communication 305.

This indication may enable PE 110(1) to calculate $\Delta t_R$. For example, PE 110(1) may determine a second time $t_2$ during which network communication 305 was processed by PE 110(1) based on local time of day 190(1). In one example, the second time $t_2$ may be a time at or near ingress of network communication 305 to PE 110(1). PE 110(1) may further decapsulate network communication 305, determine $t_1$, and perform delay calculation to calculate the difference between $t_2$ and $t_1$ (i.e., $\Delta t_R$). Thus, PE 110(1) is now aware of $\Delta t_R$.

PE 110(1) may obtain network communication 315 (e.g., a network frame) via port 155(1) and insert (e.g., via encapsulation) an indication of a third time $t_3$ during which network communication 315 was processed by PE 110(1) based on local time of day 190(1), and an indication of $\Delta t_R$. For example, the third time $t_3$ may be a time at or near ingress of network communication 315 to port 155(1). PE 110(1) may provide network communication 315, including the indication of the third time $t_3$ and the indication of $\Delta t_R$, to PE 110(2). The indication of the third time $t_3$ may be inserted as a timestamp comprising an RTP timestamp, a control word, or a dedicated field of network communication 315. The indication of $\Delta t_R$ may be inserted in a PLE header of network communication 315.

The indication of the third time $t_3$ may enable PE 110(2) to calculate $\Delta t_F$. For example, PE 110(1) may determine a fourth time $t_4$ during which network communication 315 was processed by PE 110(2) based on local time of day 190(2). In one example, the fourth time $t_4$ may be a time at or near ingress of network communication 315 to PE 110(2). PE 110(2) may further decapsulate network communication 315, determine $t_3$, and perform a delay calculation to calculate the difference between $t_4$ and $t_3$ (i.e., $\Delta t_F$). Thus, PE 110(1) is now aware of both $\Delta t_R$ and $\Delta t_F$.

PE 110(2) may obtain network communication 320 (e.g., a network frame) via port 155(2) and insert (e.g., via encapsulation) an indication of $\Delta t_F$. The indication of $\Delta t_F$ may be inserted in a PLE header of network communication 320. PE 110(2) may provide network communication 320, including the indication of $\Delta t_F$, to PE 110(1). PE 110(1) may decapsulate network communication 320 and determine $\Delta t_F$. Thus, PE 110(1) is now also aware of both $\Delta t_R$ and $\Delta t_F$, and PEs 110(1) and 110(2) may determine a difference between $\Delta t_R$ and $\Delta t_F$ and perform asymmetry compensation to compensate for the difference therebetween. For example, if $\Delta t_F$ is less than $\Delta t_R$, PE 110(2) may delay network communication 315 in egress buffer 310(2), and if $\Delta t_F$ is greater than $\Delta t_R$, PE 110(1) may delay network communication 320 in egress buffer 310(1).

More specifically, if $\Delta t_F$ is less than $\Delta t_R$, PE 110(2) may delay network communication 315 in egress buffer 310(2) for an amount of time substantially equal to the difference between $\Delta t_F$ and $\Delta t_R$, and PE 110(1) may refrain from delaying network communication 320 in egress buffer 310(1). Conversely, if $\Delta t_F$ is greater than $\Delta t_R$, PE 110(1) may delay network communication 320 in egress buffer 310(1) for an amount of time substantially equal to the difference between $\Delta t_R$ and $\Delta t_F$, and PE 110(2) may refrain from delaying network communication 315 in egress buffer 310(2). PEs 110(1) and 110(2) thereby compensate for any asymmetry between $\Delta t_F$ and $\Delta t_R$ by ensuring that propagation delays in the forward and reverse directions are substantially the same.

Because asymmetry between $\Delta t_F$ and $\Delta t_R$ may be dynamic (e.g., may change relatively slowly or quickly over time), in one example, $\Delta t_R$ and/or $\Delta t_F$ may be updated continuously (e.g., with every network communication sent between PEs 110(1) and 110(2)), periodically, randomly/pseudorandomly, or in response to certain triggers (e.g., a change in network load, a change in network design, a change in temperature, etc.). For example, PE 110(2) may also insert (e.g., via encapsulation) in network communication 320 a fifth time $t_1'$ during which network communication 320 was processed by PE 110(2) based on local time of day 190(2). The fifth time $t_1'$ may be a time at or near ingress of network communication 320 to port 155(2). This indication may enable PE 110(1) to update $\Delta t_R$. The indication of the fifth time $t_1'$ may be inserted as a timestamp comprising an RTP timestamp, a control word, or a dedicated field of network communication 320.

Further still, PE 110(1) may determine a sixth time $t_2'$ during which network communication 320 was processed by PE 110(1) based on local time of day 190(1). In one example, the sixth time $t_2'$ may be a time at or near ingress of network communication 320 to PE 110(1). PE 110(1) may decapsulate network communication 320, determine $t_1'$, and perform delay calculation to calculate the difference between $t_1$ and $t_1'$ (i.e., updating $\Delta t_R$). PE 110(1) may provide an indication of the updated $\Delta t_R$ to PE 110(2) in further network communications.

In the specific examples described herein, indications of times and $\Delta t_R$ and $\Delta t_F$ are transmitted in-band (e.g., in network communications 305, 315, and 320). However, it will be appreciated that such indications may also or alternatively be transmitted out-of-band. For example, the indications of times and $\Delta t_R$ and $\Delta t_F$ may be transmitted in separate/independent/dedicated network communications (e.g., in a packet that does not also transport PLE data).

Here, the carrier operating MPLS core 105 is using asymmetry compensation to enforce identical latency in both directions of the connection established via PW 135 between PE 110(1) and PE 110(2). This ensures that the assumption of the mobile operator (e.g., that the forward and reverse propagation delays are symmetric) holds and that no time recovery errors are introduced within the mobile operators infrastructure that is built using the connection delivered via the carrier. Furthermore, the carrier and mobile operator need not interact with regard to time synchronization. Actions taken by the mobile operator may be transparent to the carrier, and hence the carrier may serve multiple mobile operators. The carrier may ensure a symmetric connection so that the time synchronization of each mobile operator is precise and independent from other mobile operators. Without PLE and the asymmetry compensation techniques described herein, the mobile operators would need to rely on the carrier providing timing as a service and be no longer independent from the carrier and other mobile operators. The carrier would also need to deal with interactions between multiple mobile operators, created an overall a dissatisfactory situation for all involved parties.

Figure 4:
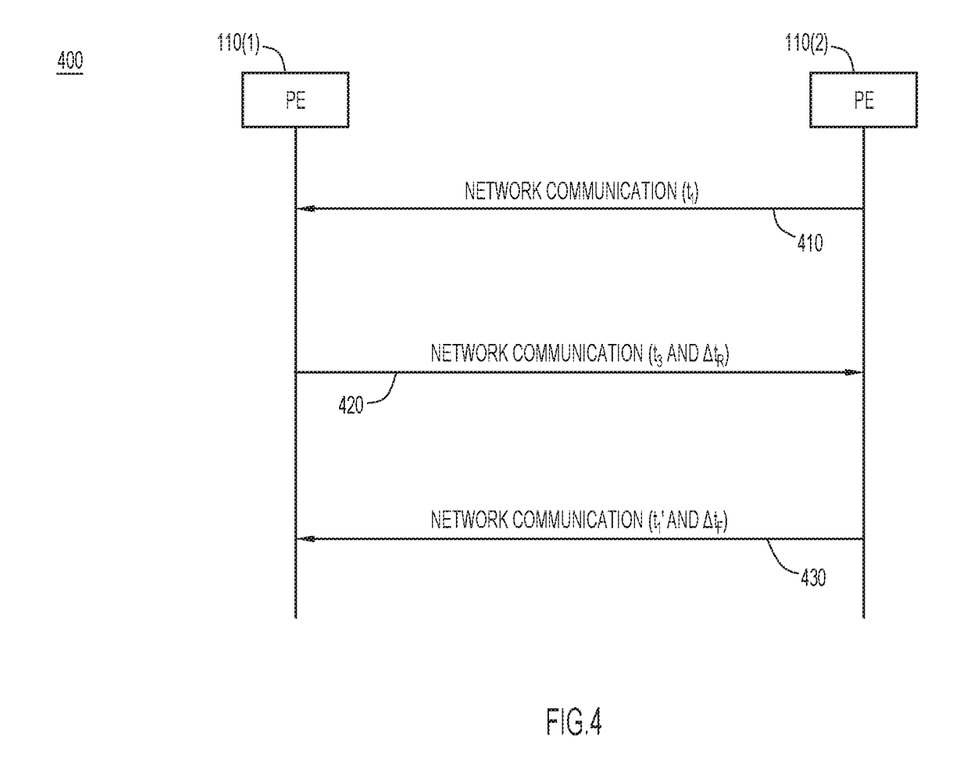
FIG. 4 illustrates a network communications diagram for asymmetry compensation in a PLE network, according to an example embodiment.

With continued reference to FIGS. 1 and 3, FIG. 4 illustrates an example network communications diagram 400 for asymmetry compensation in PLE network 100. At 410, PE 110(2) provides, to PE 110(1), network communication 305 (including an indication of the first time $t_1$). At 420, PE 110(1) provides, to PE 110(2), network communication 315 (including indications of the third time $t_3$ and $\Delta t_R$). At 430, PE 110(2) provides, to PE 110(1), network communication 320 (including indications of the fifth time $t_1'$ and $\Delta t_F$). This is consistent with the example of FIG. 3, although operations may be performed in any suitable order to compensate for asymmetry between $\Delta t_R$ and $\Delta t_F$.

For example, PE 110(1) may provide an indication of a time at which the network communication was processed by PE 110(1), after which PE 110(2) may provide an indication of $\Delta t_F$ to PE 110(1), after which PE 110(1) may provide an indication of $\Delta t_R$ to PE 110(2). Alternatively, PEs 110(1) and 110(2) may provide, to each other, indications of times at which respective network communications were processed thereat, after which PEs 110(1) and 110(2) may provide, to each other, indications of $\Delta t_R$ and $\Delta t_F$. It will be appreciated that indications of the times and propagation delays may be sent together (e.g., in network communications 315 and 320) or separately (e.g., in-band and/or out-of-band). Still other embodiments may be envisioned.

Figure 5:
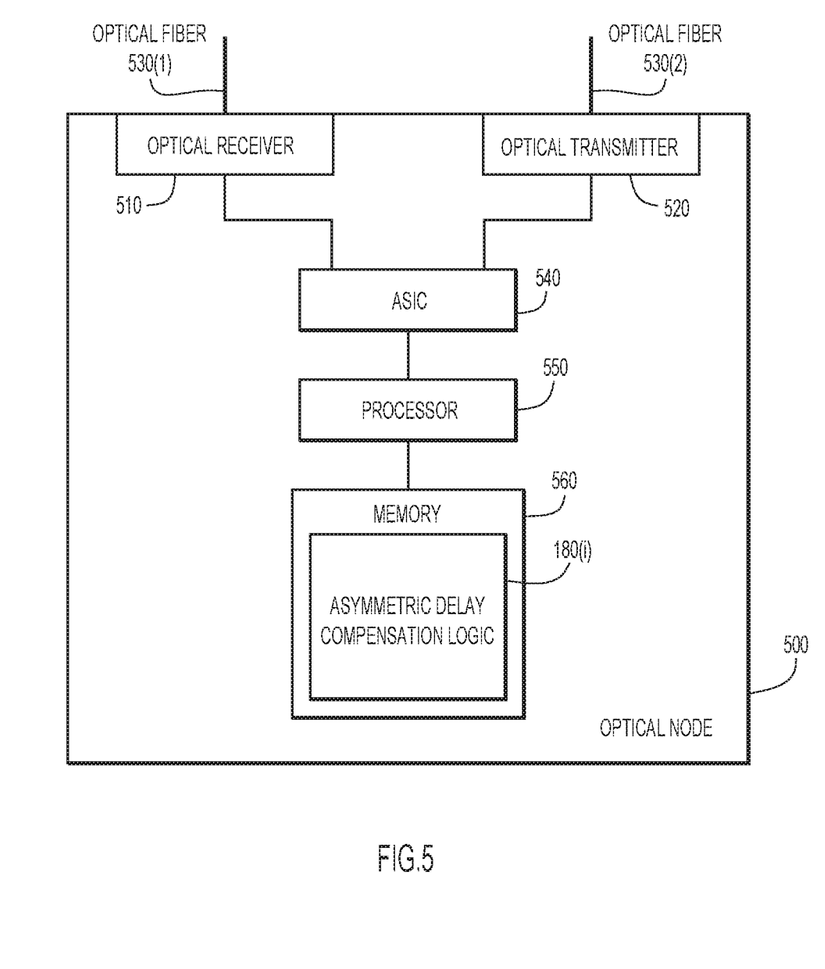
FIG. 5 illustrates a block diagram of a PLE network node configured for asymmetry compensation, according to an example embodiment.

FIG. 5 is a block diagram of an example optical node 500 (e.g., PEs 110(1) or 110(2)) that is configured to implement techniques presented herein. Optical node 500 includes a network interface in the form of optical receiver 510 and optical transmitter 520 (including optical and electrical modules) that enable communications over an optical network via one or more optical fibers 530(1) and 530(2), Application Specific Integrated Circuit (ASIC) 540 (or multiple such ASICs), which performs network processing functions, one or more processors 550, and memory 560. Processor(s) 550 may include any suitable processing entity, such as microprocessors, microcontrollers, Field-Programmable Gate Arrays (FPGAs), Application-Specific Standard Parts (ASSPs), etc. Other embodiments may be envisioned.

Memory 560 may include read only memory (ROM), Random Access Memory (RAM), magnetic disk storage media devices, optical storage media devices, Flash memory devices, electrical, optical, or other physical/tangible memory storage devices. Thus, in general, memory 560 may comprise one or more tangible (non-transitory) computer readable storage media (e.g., a memory device) encoded with software comprising computer executable instructions and when the software is executed (e.g., by the one or more processors) it is operable to perform operations described herein. In particular, memory 560 includes asymmetric delay compensation logic **180(*i*) (e.g., asymmetric delay compensation logic 180(1) or 180(2)) that, when executed, enables optical node 500** to perform the techniques described herein.

Figure 6:
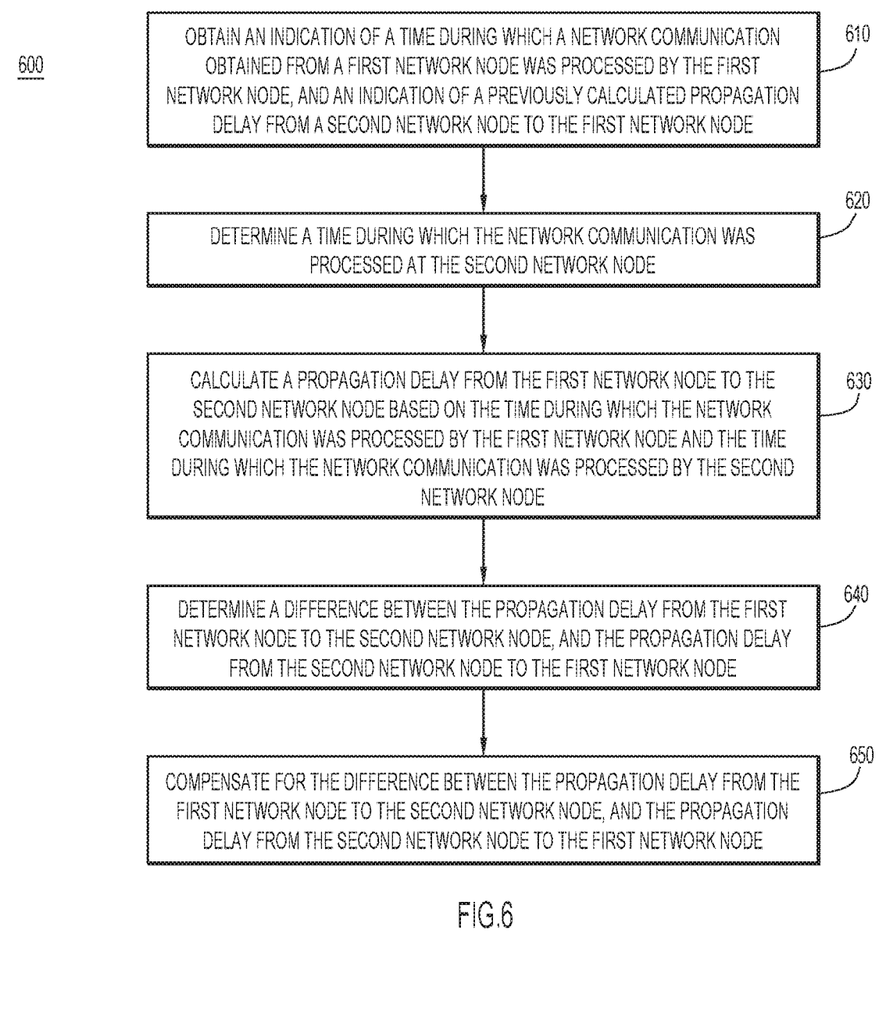
FIG. 6 illustrates a flowchart of a method for asymmetry compensation in a PLE network, according to an example embodiment.

FIG. 6 is a flowchart of an example method 600 for compensating for asymmetric propagation delays. Method 600 may be performed, for example, by PE 110(1) or PE 110(2). At 610, an indication of a time during which a network communication obtained from a first network node was processed by the first network node, and an indication of a propagation delay from a second network node to the first network node, are obtained. At 620, a time during which the network communication was processed by the second network node is determined. At 630, a propagation delay from the first network node to the second network node is calculated based on the time during which the network communication was processed by the first network node and the time during which the network communication was processed by the second network node. At 640, a difference between the propagation delay from the first network node to the second network node, and the propagation delay from the second network node to the first network node, is determined. At 650, compensation is made for the difference between the propagation delay from the first network node to the second network node, and the propagation delay from the second network node to the first network node.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, Erasable Programmable ROM (EPROM), Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, FPGA, or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining an indication of a time during which a network communication obtained from a first network node was processed by the first network node, and an indication of a propagation delay from a second network node to the first network node; determining a time during which the network communication was processed by the second network node; calculating a propagation delay from the first network node to the second network node based on the time during which the network communication was processed by the first network node and the time during which the network communication was processed by the second network node; determining a difference between the propagation delay from the first network node to the second network node, and the propagation delay from the second network node to the first network node; and compensating for the difference between the propagation delay from the first network node to the second network node, and the propagation delay from the second network node to the first network node.

In one example, determining includes determining that the propagation delay from the first network node to the second network node is less than the propagation delay from the second network node to the first network node; and compensating includes delaying the network communication in an egress buffer of the second network node for an amount of time substantially equal to the difference between the propagation delay from the first network node to the second network node, and the propagation delay from the second network node to the first network node.

In one example, determining includes determining that the propagation delay from the first network node to the second network node is greater than the propagation delay from the second network node to the first network node; and compensating includes refraining from delaying the network communication in an egress buffer of the second network node.

In one example, the method further comprises: providing, to the first network node, an indication of the propagation delay from the first network node to the second network node.

In one example, the method further comprises: providing, to the first network node, an indication of a time during which another network communication was processed by the second network node to enable the first network node to calculate the propagation delay from the second network node to the first network node.

In one example, obtaining includes obtaining the network communication, wherein the network communication includes the indication of the time during which the network communication was processed by the first network node, and the indication of the propagation delay from the second network node to the first network node.

In one example, the method further comprises: obtaining an indication of a time during which another network communication obtained from the first network node was processed by the first network node; determining a time during which the other network communication was processed by the second network node; calculating an updated propagation delay from the first network node to the second network node based on the time during which the other network communication was processed by the first network node and the time during which the other network communication was processed by the second network node; determining a difference between the updated propagation delay from the first network node to the second network node, and the propagation delay from the second network node to the first network node; and compensating for the difference between the updated propagation delay from the first network node to the second network node, and the propagation delay from the second network node to the first network node.

In one example, the first network node includes a first local time of day and the second network node includes a second local time of day, and the first local time of day and the second local time of day are aligned.

In one example, the first network node and the second network node form at least part of a private line emulation network.

In one example, compensating includes compensating for an asymmetry of lengths of a first optical fiber and of a second optical fiber between the first network node and the second network node, a load of a network of which the first network node and the second network node are a part, a design of the network, a temperature of the first optical fiber, or a temperature of the second optical fiber.

In another form, an apparatus is provided. The apparatus comprises: a memory configured to store executable instructions; and one or more processors coupled to the memory, wherein the one or more processors are configured to: obtain an indication of a time during which a network communication obtained from a first network node was processed by the first network node, and an indication of a propagation delay from a second network node to the first network node; determine a time during which the network communication was processed by the second network node; calculate a propagation delay from the first network node to the second network node based on the time during which the network communication was processed by the first network node and the time during which the network communication was processed by the second network node; determine a difference between the propagation delay from the first network node to the second network node, and the propagation delay from the second network node to the first network node; and compensate for the difference between the propagation delay from the first network node to the second network node, and the propagation delay from the second network node to the first network node.

In another form, one or more non-transitory computer readable storage media are provided. The non-transitory computer readable storage media are encoded with instructions that, when executed by a processor, cause the processor to: obtain an indication of a time during which a network communication obtained from a first network node was processed by the first network node, and an indication of a propagation delay from a second network node to the first network node; determine a time during which the network communication was processed by the second network node; calculate a propagation delay from the first network node to the second network node based on the time during which the network communication was processed by the first network node and the time during which the network communication was processed by the second network node; determine a difference between the propagation delay from the first network node to the second network node, and the propagation delay from the second network node to the first network node; and compensate for the difference between the propagation delay from the first network node to the second network node, and the propagation delay from the second network node to the first network node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   providing a first network communication to a first network node from a second network node, wherein the first network node and the second network node are separated from one another by a switched path network;
   obtaining, from the first network node, a second network communication including an indication of a propagation delay from the second network node to the first network node that was calculated based on a time during which the first network communication was processed by the first network node and a time during which the first network communication was processed by the second network node;
   calculating a propagation delay from the first network node to the second network node based on a time during which the second network communication was processed by the first network node and a time during which the second network communication was processed by the second network node;
   determining that the propagation delay from the first network node to the second network node is less than the propagation delay from the second network node to the first network node;
   delaying the second network communication in an egress buffer of the second network node for an amount of time substantially equal to a difference between the propagation delay from the first network node to the second network node, and the propagation delay from the second network node to the first network node;
   providing a third network communication to the first network node from the second network node;
   obtaining, from the first network node, a fourth network communication including an indication of an updated propagation delay from the second network node to the first network node that was calculated based on a time during which the third network communication was processed by the first network node and a time during which the third network communication was processed by the second network node;
   calculating an updated propagation delay from the first network node to the second network node based on a time during which the fourth network communication was processed by the first network node and a time during which the fourth network communication was processed by the second network node;
   determining that the updated propagation delay from the first network node to the second network node is less than the updated propagation delay from the second network node to the first network node; and
   delaying the fourth network communication in an egress buffer of the second network node for an amount of time substantially equal to a difference between the updated propagation delay from the first network node to the second network node, and the updated propagation delay from the second network node to the first network node.

2. The method of claim 1, further comprising:
   providing, to the first network node, an indication of the propagation delay from the first network node to the second network node.

3. The method of claim 1, wherein the first network communication includes an indication of the time during which the first network communication was processed by the second network node.

4. The method of claim 1, wherein the second network communication further includes the indication of the time during which the second network communication was processed by the first network node.

5. The method of claim 1, wherein a local time of day of the first network node and a local time of day of the second network node are aligned.

6. The method of claim 1, wherein the first network node and the second network node form at least part of a private line emulation network.

7. The method of claim 1, wherein delaying the second network communication includes compensating for an asymmetry of lengths of a first optical fiber and of a second optical fiber between the first network node and the second network node.

8. The method of claim 1, wherein delaying the second network communication includes compensating for a load of a network that includes the first network node and the second network node.

9. The method of claim 1, wherein delaying the second network communication includes compensating for a design of a network that includes the first network node and the second network node.

10. The method of claim 1, wherein delaying the second network communication includes compensating for a temperature of an optical fiber between the first network node and the second network node.

11. An apparatus comprising:
a memory configured to store executable instructions; and
one or more processors coupled to the memory, wherein the one or more processors are configured to:
provide a first network communication to a network node, wherein the network node and the apparatus are separated from one another by a switched path network;
obtain, from the network node, a second network communication including an indication of a propagation delay from the apparatus to the network node that was calculated based on a time during which the first network communication was processed by the network node and a time during which the first network communication was processed by the apparatus;
calculate a propagation delay from the network node to the apparatus based on a time during which the second network communication was processed by the network node and a time during which the second network communication was processed by the apparatus;
determine that the propagation delay from the network node to the apparatus is less than the propagation delay from the apparatus to the network node;
delay the second network communication in an egress buffer of the apparatus for an amount of time substantially equal to a difference between the propagation delay from the network node to the apparatus, and the propagation delay from the apparatus to the network node;
provide a third network communication to the network node from the apparatus;
obtaining, from the network node, a fourth network communication including an indication of an updated propagation delay from the apparatus to the network node that was calculated based on a time during which the third network communication was processed by the network node and a time during which the third network communication was processed by the apparatus;
calculate an updated propagation delay from the network node to the apparatus based on a time during which the fourth network communication was processed by the network node and a time during which the fourth network communication was processed by the apparatus;
determine that the updated propagation delay from the network node to the apparatus is less than the updated propagation delay from the apparatus to the network node; and
delay the fourth network communication in an egress buffer of the apparatus for an amount of time substantially equal to a difference between the updated propagation delay from the network node to the apparatus, and the updated propagation delay from the apparatus to the network node.

12. The apparatus of claim 11, wherein the one or more processors are further configured to:
provide, to the network node, an indication of the propagation delay from the network node to the apparatus.

13. The apparatus of claim 11, wherein the first network communication includes an indication of the time during which the first network communication was processed by the apparatus.

14. The apparatus of claim 11, wherein the second network communication further includes the indication of the time during which the first network communication was processed by the network node.

15. The apparatus of claim 11, wherein a local time of day of the network node and a local time of day of the apparatus are aligned.

16. One or more non-transitory computer readable storage media encoded with instructions that, when executed by a processor, cause the processor to:
provide a first network communication to a first network node from a second network node, wherein the first network node and the second network node are separated from one another by a switched path network;
obtain, from the first network node, a second network communication including an indication of a propagation delay from the second network node to the first network node that was calculated based on a time during which the first network communication was processed by the first network node and a time during which the first network communication was processed by a second network node;
calculate a propagation delay from the first network node to the second network node based on a time during which the second network communication was processed by the first network node and a time during which the second network communication was processed by the second network node;
determine that the propagation delay from the first network node to the second network node is less than the propagation delay from the second network node to the first network node;
delay the second network communication in an egress buffer of the second network node for an amount of time substantially equal to a difference between the propagation delay from the first network node to the second network node, and the propagation delay from the second network node to the first network node;

provide a third network communication to the first network node from the second network node;

obtain, from the first network node, a fourth network communication including an indication of an updated propagation delay from the second network node to the first network node that was calculated based on a time during which the third network communication was processed by the first network node and a time during which the third network communication was processed by the second network node;

calculate an updated propagation delay from the first network node to the second network node based on a time during which the fourth network communication was processed by the first network node and a time during which the fourth network communication was processed by the second network node;

determine that the updated propagation delay from the first network node to the second network node is less than the updated propagation delay from the second network node to the first network node; and delay the fourth network communication in an egress buffer of the second network node for an amount of time substantially equal to a difference between the updated propagation delay from the first network node to the second network node, and the updated propagation delay from the second network node to the first network node.

17. The one or more non-transitory computer readable storage media of claim 16, wherein the instructions further cause the processor to:

provide, to the first network node, an indication of the propagation delay from the first network node to the second network node.

18. The one or more non-transitory computer readable storage media of claim 16, wherein the first network communication includes an indication of the time during which the first network communication was processed by the second network node.

19. The one or more non-transitory computer readable storage media of claim 16, wherein the second network communication further includes the indication of the time during which the first network communication was processed by the first network node.

20. The one or more non-transitory computer readable storage media of claim 16, wherein the instructions further cause the processor to delay the second network communication by compensating for an asymmetry of lengths of a first optical fiber and of a second optical fiber between the first network node and the second network node.

* * * * *